INVENTOR.
Paul DiMatteo

INVENTOR.
Paul DiMatteo

United States Patent Office 3,222,671
Patented Dec. 7, 1965

3,222,671
RANGING-BLANKING CIRCUIT
Paul L. Di Matteo, Levittown, N.Y., assignor, by mesne assignments, to the United States of America as represented by the Secretary of the Navy
Filed Sept. 13, 1962, Ser. No. 224,595
4 Claims. (Cl. 343—7.3)

This invention relates to a radar ranging and blanking circuit and more particularly to a circuit for blanking video signals to the input of the tracking circuit which represent targets beyond the range of a selected target.

In many radar equipment in use today functions not only as target locating range measuring systems but also as automatic target tracking systems. In these automatic target tracking systems the radar antenna as well as weapons may be continuously, automatically, and accurately trained on a target.

However, instability of present day radar tracking equipment to discriminate between a selected target and undesired targets often results in tracking information which causes the equipment to track the wrong target and completely lose the selected target. The present invention proposes to eliminate this undesirable feature of tracking a false target by providing circuitry for use with a radar ranging and radar tracking system to prevent reception by the tracking system of all target pulse echoes from targets having a range greater than that of the first or selected target. This is done by blanking or disabling the input circuit of the range and tracking signal almost immediately after a pulse echo from the selected target is received.

If the selected target as well as the radar transmitting station was fixed in position the execution of the above operation would be simple. The radar receiver could be disabled merely by limiting the time interval a radar receiver might actively receive. However, with a moving target and/or a moving radar transmitter station the problem becomes more difficult. Since the range between the selected target and the radar receiver may be continuously changing, the time at which the radar receiver must be disabled to prevent signals from targets beyond the range of the selected target is variable dependent on the instantaneous range between the selected target and the radar receiver.

The present invention further provides a radar ranging and blanking system which not only blocks all reception by a radar receiver of signals from targets beyond the range of a selected target regardless of whether that range is changing or not but also blocks substantially all extraneous signals, e.g., jamming signals from the system.

The present invention contemplates a blanking circuit for preventing signals from a target beyond the range of a selected target from entering the radar equipment wherein a blanking signal is applied to the radar receiving circuit immediately after a signal is received from the selected target and wherein the time of occurrence of the blanking signal is made automatically to hover about the target signal when the range of the selected target is caused to vary as by a moving target.

Therefore, it is an object of the present invention to provide a ranging and blanking circuit for use with a radar tracking system wherein a radar receiver is automatically and periodically disabled after passing the reflected video within each repetition cycle from a selected moving target.

Another object of the present invention is to provide a ranging and blanking circuit wherein the radar receiver is automatically disabled after reception of the target video and wherein the time of occurrence of the blanking pulse changes as the selected target range increases or decreases.

Still another object of the present invention is to provide an automatic radar ranging and blanking circuit from which all extraneous signals occurring after receipt of the reflected pulse from a selected target are blocked at the receiver portion of the circuit.

A further object of the present invention is to provide a circuit for rapid automatic radar ranging and blanking which is simple in construction, uncomplicated in operation, and which may be adapted for use with many radar ranging circuits to permit rapid range isolation of a radar return echo.

Other objects and features of the invention will become apparent to those skilled in the art as the disclosure is made in the following detailed description of the preferred embodiment of the invention as illustrated in the accompanying sheets of drawing in which.

Figure 1:
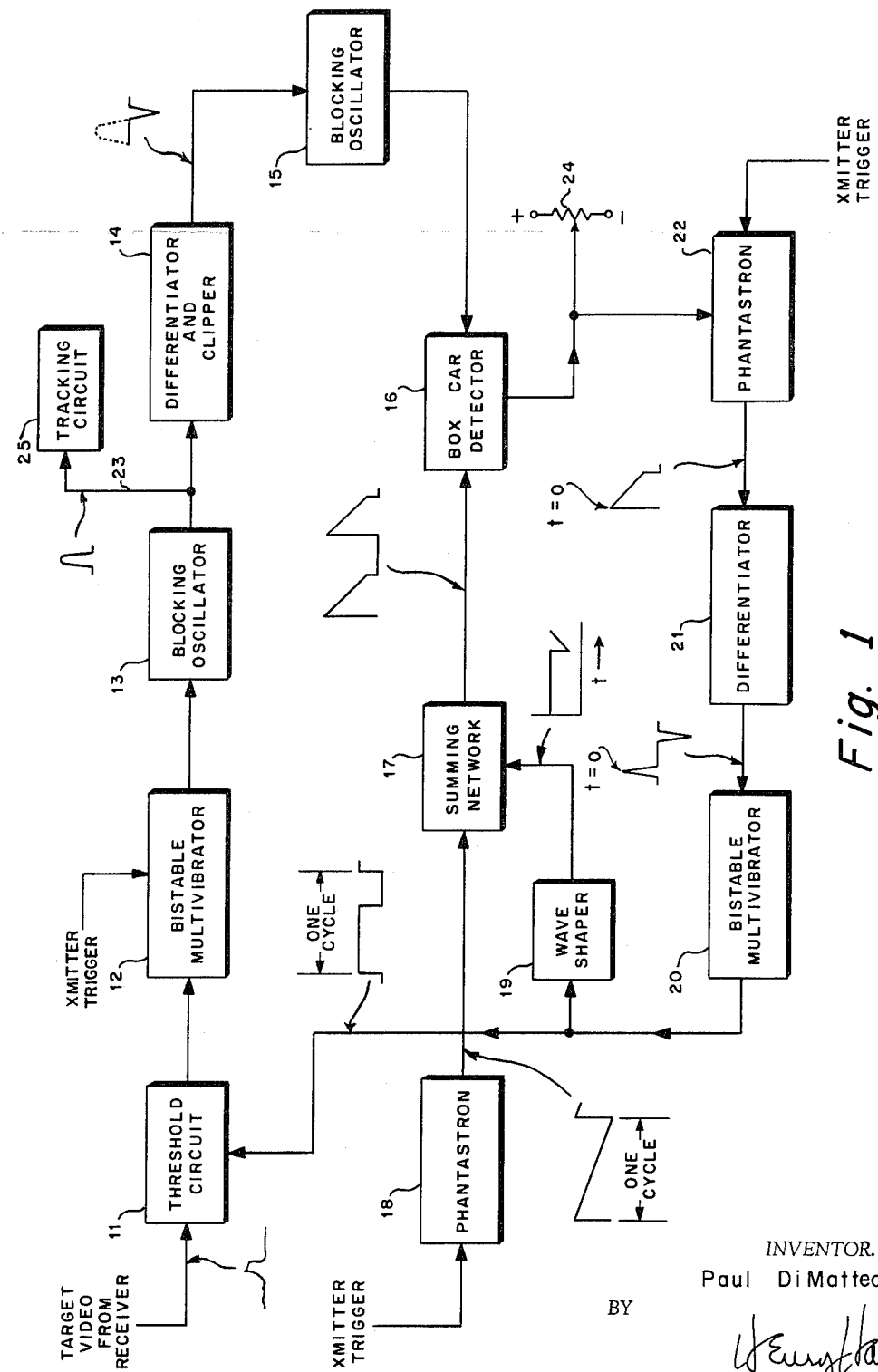
FIG. 1 shows in block diagram form the preferred embodiment of this invention.

Referring now more particularly to FIG. 1, there is shown a threshold circuit 11 which may be incorporated in a typical radar receiver. The threshold circuit 11 is of conventional design and provides a block to all video signals which have an amplitude less than a predetermined set level or which may block all video signals during receipt of a blocking pulse. The output terminal of threshold circuit 11 is connected to the input of bistable multivibrator 12. Any video signal which exceeds that level set in threshold circuit 11 will pass therethrough and set the bistable multivibrator 12. Multivibrator 12 is reset by each transmitter trigger. The leading edge of the multivibrator output triggers the blocking oscillator 13 which provides as an output an artificial range gate pulse coincident with the video pulse for a conventional angle tracking system 25 via conductor 23. Blocking oscillator 13 is also connected to differentiator and clipper circuit 14 wherein the output pulse from blocking oscillator 13 is differentiated and applied as an input to blocking oscillator 15, the positive portion of the differentiated pulse being clipped. Therefore, the differentiated trailing edge of the output pulse from differentiator and clipper circuit 14 triggers blocking oscillator 15. The output of blocking oscillator 15 is connected to boxcar detector 16 which is to be discussed more fully hereinbelow.

A phantastron sweep circuit 18 is connected as the second input to boxcar detector 16 through a summing network 17. The radar transmitter trigger circuit triggers the phantastron sweep circuit 18, the output of which is applied to the summing network 17 where it is added to the wave shape emanating from a wave shaper circuit 19 before it is applied to boxcar detector 16.

The output of boxcar detector 16 is a unidirectional voltage which is proportional to range. The output of boxcar detector 16 is connected to phantastron sweep circuit 22 which has a sweep which is initiated by the transmitter trigger pulse. The time of duration of the sweep of phantastron sweep circuit 22 within repetition periods is a function of the unidirectional voltage applied to it from boxcar detector 16. Therefore, a simple biasing gain adjustment circuit 24 connected between boxcar detector circuit 16 and phantastron sweep circuit 22 may be adjusted so that the phantastron sweep circuit 22 always disables at a range or time referred to the time of transmission of the radar pulse which is just slightly after the time of arrival of the video pulse or blocking oscillator pulses.

The output of phantastron sweep circuit 22 is connected to bistable multivibrator 20 through differentiator circuit 21. The output of bistable multivibrator 20 is also connected as an input to threshold circuit 11 and wave shaper circuit 19. Wave shaper circuit 19 has an output which is connected to summing circuit 17.

When the phantastron sweep circuit 22 is disabled, the sweep voltage output thereof abruptly changes to zero. A discontinuity in the phantastron sweep waveform is then present at this point. This is shown on the drawing by the waveform between phantastron sweep circuit 22 and differentiator 21. Thus, when the sweep voltage is differentiated by differentiator 21 a positive pulse coincident with the transmitted trigger pulse is provided to reset multivibrator 20 and a negative pulse coincident with the discontinuity in the phantastron sweep waveform is provided to trigger or set bistable multivibrator 20. These positive and negative pulses are shown on the drawing between differentiator 21 and bistable multivibrator 20. Since the discontinuity occurs slightly after the time that the selected target video occurs, so also does the negative pulse from differentiator network circuit 21.

Bistable multivibrator 20 has a negative pulse as an output which is initiated with the negative pulse output from differentiator circuit 21 which is used to raise the threshold level of threshold circuit 11. As aforesaid, this negative pulse from differentiator circuit 21 is coincident with the discontinuity of the sweep voltage of phantastron 22 and occurs in time only after the video signal from the selected target is received. Therefore, throughout the time that this negative pulse is applied to threshold circuit 11 all video signals occurring after the target video are prevented from triggering bistable multivibrator 12.

Figure 3:
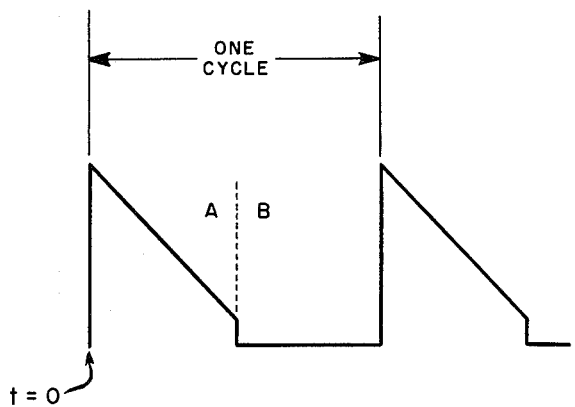
FIG. 3 shows a waveform useful in the explanation of the operation of this invention.

In addition, the output from multivibrator 20 is supplied to wave shaper circuit 19. The wave shaper circuit 19 converts the multivibrator output pulse to a wave shape such that when added in the summing network 17 to the output of phantastron 18 it will yield the waveform indicated in FIG. 3 and also shown on FIG. 1 between summing network 17 and boxcar detector 16. This is the wave shape that is applied to boxcar detector 16.

Thus all signals from targets beyond the range of the first or selected target signal arriving at the threshold circuit 11 are prevented from entering therethrough. Therefore, the narrow gage signal fed to tracking circuit 25 is an unambiguous representation of the first or selected target.

Figure 2:
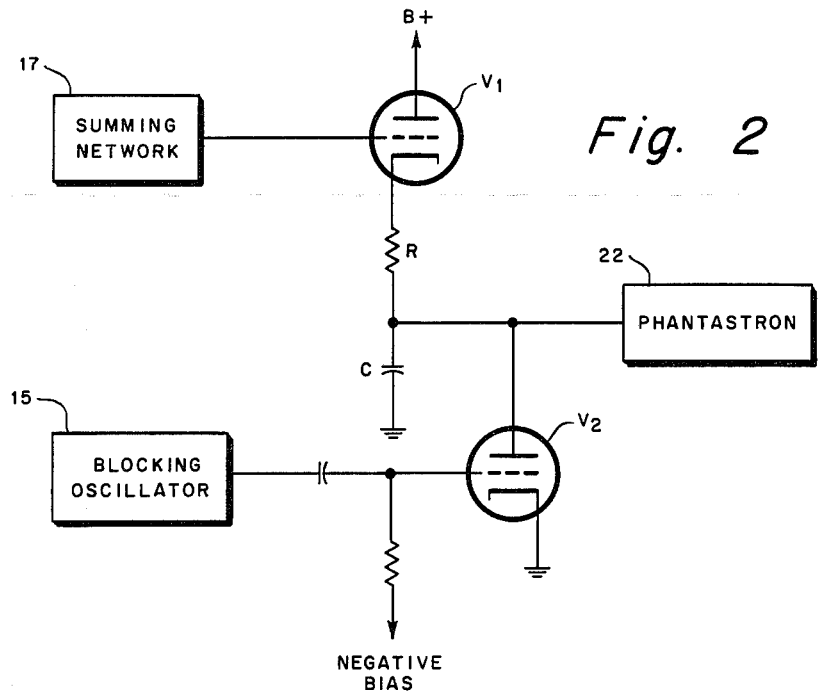
FIG. 2 illustrates in schematic form the boxcar detector of FIG. 1.

Referring now more particularly to FIG. 2, there is shown in schematic form a boxcar detector similar to that used in the present invention. The cathode of triode V1 is connected through a resistance R to the plate of triode V2. A capacitor C is connected between ground and resistance R and the B+ power source is connected to the plate of triode V1.

The operation of the boxcar detector is such that the output at the plate of V2 is a D.C. voltage having a magnitude proportional to the area of the input pulse at the grid of triode V1.

In this case the pulses from summing network 17, each of which has an area proportional to range, are fed to the grid of triode V1. The output at the plate of triode V2 is a D.C. voltage which has a magnitude determined by the latest available input pulse provided capacitor C is discharged once during each repetition cycle. Each pulse from blocking oscillator 15 which is fed to the grid of triode V2 causes triode V2 to become conductive and capacitor C to discharge to ground. Thus, except for short gaps between boxcars, the output at the plate of V2 is a D.C. voltage proportional to range. If by chance the pulse from blocking oscillator 15 fails to occur during each repetition cycle, the output will be proportional to the range of the selected target at the last time a blocking oscillator pulse occurred. Thus, even if the target video is relatively weak such that it has insufficient amplitude to exceed the level of the threshold circuit 11 once per repetition cycle, the present invention will still prevent video pulses from ranges beyond the selected target from exceeding the threshold level of circuit 11. This is true because bistable multivibrator 12 will continue to be triggered once per repetition cycle.

The operation of the overall circuit is such that at whatever range or time after the transmitter trigger the target video occurs, the discontinuity or negative going portion of the sweep voltage waveform from phantastron 22 shown in FIG. 1 tends to occur after the time of the blocking oscillator output from blocking oscillator 15. In other words, the blocking oscillator output from blocking oscillator 15, which occurs after the target video, is on the A side of the waveform shown in FIG. 3. This produces the unidirectional voltage from boxcar detector 16 whose gain and D.C. level is such as to drive the discontinuity shown in FIG. 3 toward time or range zero. However, as soon as the discontinuity passes the time or range at which the blocking oscillator pulse from blocking oscillator 15 occurs, the unidirectional voltage from boxcar detector 16 drops and tends to drive the discontinuity out toward maximum range. This action keeps the position of the discontinuity hovering about the position of the pulse from blocking oscillator 15. Since the beginning of the output pulse from multivibrator circuit 20 is essentially coincident with the output from blocking oscillator 15 and is used to disable the threshold circuit 11, essentially any video signal following the target will not be able to actuate the blocking oscillator 13 which supplies the artificial range gate to the tracking system.

The output of bistable multivibrator 20, which is a negative pulse, begins just after the video arrives at the receiver. Therefore, this negative pulse is used to blank or block undesired video signals and at the same time is changed into a wave shape that upon summation with the sweep voltage from phantastron 18 provides a pulse for boxcar detector 16 which is proportional to range. Depending on the time of occurrence of the multivibrator output the magnitude of the output from wave shaper 19 is such that on summation with the phantastron sweep voltage the sweep voltage is caused to become discontinuous at a time just after the arrival of a video pulse from the selected target.

The output from boxcar detector 16 may be used as the input to a range indicator to provide a continuous indication of range. Also, since the gate pulse from blocking oscillator 13 is coincident with the video pulse and occurs only when a video pulse is passed through threshold circuit 11, it provides unambiguous tracking information to tracking system 25.

Obviously many modifications and variations of the present invention are possible in the light of the above teachings. It is, therefore, to be understood that, within the scope of the appended claims, the invention may be practiced otherwise than as specifically described.

What is claimed is:

1. A ranging and blanking circuit for use with a target tracking system for blanking all video signals from targets beyond the range of a selected target, comprising in combination:

threshold circuit means,
input terminal means for feeding target video pulses through said threshold circuit,
bistable multivibrator means connected to said threshold circuit mean,
boxcar detector means,
first phantastron means connected to said boxcar detector means providing a sweep voltage beginning with each cycle having a discontiuity occuring at a time within the cycle dependent on the magnitude of the output from said boxcar detector means,
differentiator means connected between said first phantastron means and said bistable multivibrator providing a pulse coincident with said discontinuity to trigger said bistable multivibrator means,
second phantastron means providing a sweep voltage beginning with each cycle, summing circuit means connected between said second phantastron means and said boxcar detector means, wave shaper means connected between said bistable multivibrator means and said summing circuit means for summing the respective outputs therefrom to provide said boxcar detector means with a pulse having a magnitude and duration proportional to range from the selected target, blocking oscillator means connected between said threshold circuit means and said boxcar detector means providing said boxcar detector means with a discharge pulse for each video pulse passing through said threshold circuit, whereby the output from said boxcar detector means is a D.C. voltage which is proportional to range of the selected target.

2. A ranging and blanking circuit for use with a target tracking system for blanking all video signals from targets beyond the range of a selected target, comprising in combination:

threshold circuit means, input terminal means for feeding target video pulses through said threshold circuit means, bistable multivibrator means connected to said threshold circuit means, boxcar detector means, blocking oscillator means connected between said threshold circuit means and said boxcar detector means providing said boxcar detector means with a discharge pulse for each video pulse passed through said threshold circuit means, circuit means connected between said boxcar detector means and said bistable multivibrator means responsive to the output of said boxcar detector to trigger said bistable multivibrator means once per cycle immediately after arrival of the target video pulse at said threshold circuit means to provide a blanking pulse to said threshold circuit means, whereby all other video pulses occuring during each cycle after said target video pulse occurs are prevented from passing through said threshold circuit means.

3. A ranging and blanking circuit for use with a target tracking system for blanking all video signals from targets beyond the range of a selected target, comprising in combination:

threshold circuit means, tracking circuit means, input terminal means for feeding target video pulses through said threshold circuit to said tracking circuit, bistable multivibrator means connected to said threshold circuit means, boxcar detector means, first phantastron means connected to said boxcar detector means providing a sweep voltage beginning with each cycle having a discontinuity occurring at a time within the cycle dependent on the magnitude of the output from said boxcar detector means, differentiator means connected between said first phantastron means and said bistable multivibrator providing a pulse coincident with said discontinuity to trigger said bistable multivibrator means, second phantastron means providing a sweep voltage beginning with each cycle, summing circuit means connected between said second phantastron means and said boxcar detector means, wave shaper means connected between said bistable multivibrator means and said summing circuit means for summing the respective outputs therefrom to provide said boxcar detector means with a pulse having a magnitude and duration proportional to range from the selected target, blocking oscillator means connected between said threshold circuit means and said boxcar detector means providing said boxcar detector means with a discharge pulse for each video pulse passing through said threshold circuit, whereby the output from said boxcar detector means is a D.C. voltage which is proportional to range of the selected target.

4. A ranging and blanking circuit for use with a target tracking system for blanking all video signals from targets beyond the range of a selected target, comprising in combination:

threshold circuit means, tracking circuit means, input terminal means for feeding target video pulses through said threshold circuit means to said tracking circuit means, bistable multivibrator means connected to said threshold circuit means, boxcar detector means, blocking oscillator means connected between said threshold circuit means and said boxcar detector providing said boxcar detector means with a discharge pulse for each video pulse passed through said threshold circuit means, circuit means connected between said boxcar detector means and said bistable multivibrator responsive to the output of said boxcar detector to trigger said bistable multivibrator means once per cycle immediately after arrival of the target video pulse at said threshold circuit means to provide a blanking pulse to said threshold circuit means, whereby all other video pulses occurring during each cycle after said target video pulse occurs are prevented from passing through said threshold circuit means to said tracking circuit means.

References Cited by the Examiner

UNITED STATES PATENTS

| | | | |
|---|---|---|---|
| 2,421,018 | 5/1947 | De Rosa | 343—7 |
| 2,854,661 | 9/1958 | Emmett | 343—7.3 |
| 3,068,468 | 12/1963 | Bretscher et al. | 343—7.3 |

LEWIS H. MYERS, *Primary Examiner.*

CHESTER L. JUSTUS, *Examiner.*